United States Patent
Costello et al.

(10) Patent No.: US 11,080,976 B2
(45) Date of Patent: Aug. 3, 2021

(54) REAL TIME BYPASS DETECTION IN SCANNER

(71) Applicant: NCR Corporation, Duluth, GA (US)

(72) Inventors: Christopher John Costello, Suwanee, GA (US); John Crooks, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 182 days.

(21) Appl. No.: 15/624,326

(22) Filed: Jun. 15, 2017

(65) Prior Publication Data

US 2018/0365951 A1 Dec. 20, 2018

(51) Int. Cl.
| | |
|---|---|
| *G08B 13/24* | (2006.01) |
| *G07G 3/00* | (2006.01) |
| *G08B 13/194* | (2006.01) |
| *G06K 9/00* | (2006.01) |
| *G06Q 20/20* | (2012.01) |
| *G06Q 20/18* | (2012.01) |
| *G06K 7/10* | (2006.01) |
| *G07G 1/00* | (2006.01) |

(52) U.S. Cl.
CPC ............ *G08B 13/246* (2013.01); *G06K 7/10* (2013.01); *G06K 9/00771* (2013.01); *G06Q 20/208* (2013.01); *G07G 1/0054* (2013.01); *G07G 3/003* (2013.01); *G08B 13/194* (2013.01); *G06K 7/10762* (2013.01); *G06Q 20/18* (2013.01)

(58) Field of Classification Search
CPC ..... G06K 9/00771; G07G 3/003; G06Q 20/20
See application file for complete search history.

(56) References Cited

U.S. PATENT DOCUMENTS

| | | | |
|---|---|---|---|
| 6,788,205 B1 * | 9/2004 | Mason | A47F 9/047 235/383 |
| 8,448,859 B2 | 5/2013 | Goncalves et al. | |
| 8,544,736 B2 | 10/2013 | Connell et al. | |
| 8,570,375 B1 * | 10/2013 | Srinivasan | G06Q 20/206 348/150 |
| 9,171,442 B2 | 10/2015 | Clements | |
| 9,911,112 B2 | 3/2018 | Crooks | |
| 10,043,119 B1 * | 8/2018 | Egan | G06K 17/0029 |
| 2009/0026269 A1 * | 1/2009 | Connell, II | G06K 7/14 235/462.41 |
| 2009/0307097 A1 * | 12/2009 | De Faria | G07G 1/0054 705/17 |
| 2011/0320296 A1 * | 12/2011 | Edwards | G06Q 20/20 705/23 |
| 2012/0127314 A1 * | 5/2012 | Clements | G07G 1/0063 348/150 |
| 2012/0321146 A1 * | 12/2012 | Kundu | G06Q 30/06 382/118 |

(Continued)

OTHER PUBLICATIONS

EP Search Report—dated Nov. 2, 2018.

*Primary Examiner* — Florian M Zeender
*Assistant Examiner* — Whitney Poffenbarger
(74) *Attorney, Agent, or Firm* — Schwegman, Lundberg & Woessner

(57) ABSTRACT

A terminal includes an item scanner. The item scanner determines whether an item that passes within a field of view of the scanner during a transaction has a properly noted barcode recorded for the transaction. When the item fails to have a properly noted barcode an alert is raised in real time for assistance and/or investigation of the transaction.

18 Claims, 4 Drawing Sheets

(56) References Cited

U.S. PATENT DOCUMENTS

| | | | | |
|---|---|---|---|---|
| 2014/0176719 A1* | 6/2014 | Migdal | ............... | G07G 1/0054 |
| | | | | 348/150 |
| 2014/0263631 A1* | 9/2014 | Muniz | .................... | A47F 9/047 |
| | | | | 235/383 |
| 2014/0338987 A1* | 11/2014 | Kobres | .................... | A47F 9/04 |
| | | | | 177/1 |
| 2015/0193780 A1* | 7/2015 | Migdal | ............... | G06Q 30/018 |
| | | | | 705/317 |
| 2016/0132854 A1* | 5/2016 | Singh | .................. | G07G 1/0036 |
| | | | | 705/23 |
| 2016/0189277 A1* | 6/2016 | Davis | ................ | G06Q 30/0633 |
| | | | | 705/26.8 |
| 2016/0283602 A1* | 9/2016 | Charpentier | .......... | G06F 16/955 |
| 2016/0335856 A1* | 11/2016 | Barkan | ............... | G07G 1/0054 |
| 2016/0350738 A1* | 12/2016 | Crooks | ............... | G06Q 20/208 |
| 2019/0172039 A1* | 6/2019 | Kambara | .................. | G06T 7/20 |

* cited by examiner

REAL TIME BYPASS DETECTION IN SCANNER

BACKGROUND

A common way to steal products in retails stores is to fake a scan of an item that is supposed to be purchased. This can be done by a customer operating a Self-Service Terminal (SST) or a cashier operating a Point-Of-Sale (POS) terminal on behalf of a friend checking out at the retail store (often referred to as sweat hearting).

Faking a scan can include covering the barcode or purposely having the barcode face away from the lens of camera/scanner to appear as though an item is being scanned for security purposes, but the item is not actually scanned.

However, not every missed item barcode scan is problematic during a retail checkout. Sometimes the barcode may not be read and may be manually entered thereafter by a customer or cashier, such that the missed item barcode scan is not problematic and was unintentional in nature.

Still, fake item barcode scans at SST and POS terminals may be, for some retailers, the number one source of theft, and the issue is significant in the industry. In fact, retail theft is a multi-billion dollar problem for the retail industry. It is extremely difficult to detect fake/missed scans and even more difficult to detect when such missed scans were unintentional or intentional.

SUMMARY

In various embodiments, methods and a terminal are provided for real-time bypass detection in a scanner.

According to an embodiment, a method real-time bypass detection in a scanner is provided. Specially, and in an embodiment, an image, captured in real time by a scanner, for an item during a transaction, at a terminal, is attempted to be correlated with an identifier noted for the item. A determination is made as to whether to raise an alert for intervention during the transaction based on the attempted correlation.

DETAILED DESCRIPTION

Figure 1:
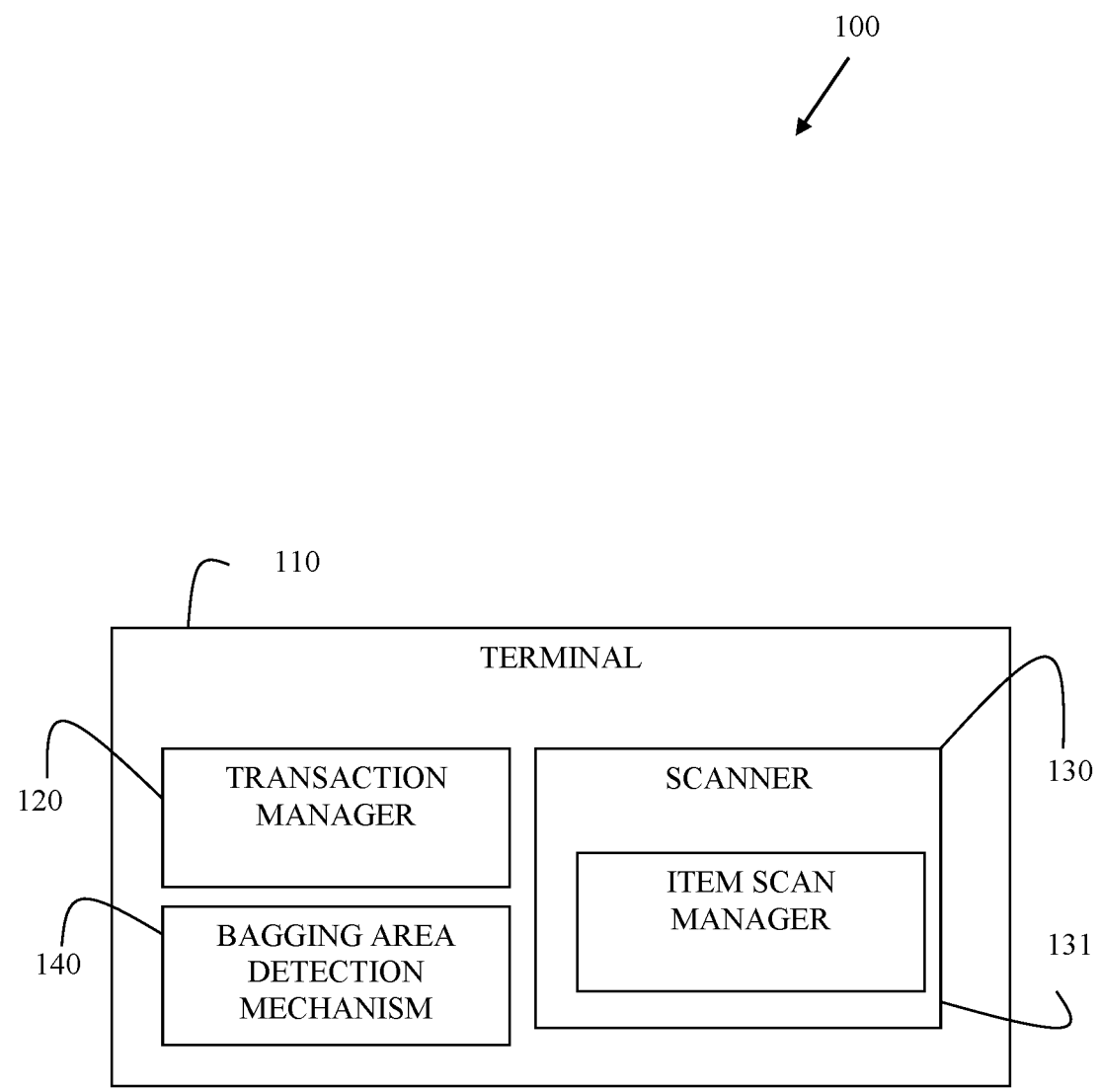
FIG. 1 is a diagram illustrating components of a real-time bypass detection in a scanner system, according to an example embodiment.

FIG. 1 is a diagram illustrating components of a real-time bypass detection in a scanner system 100, according to an example embodiment. It is to be noted that the system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of real-time bypass detection in a scanner, presented herein and below.

Furthermore, the techniques and the systems presented herein and below (for real-time bypass detection in a scanner) may include all or some combination of the components shown with the system 100. The methods are programmed as executable instructions in memory and/or non-transitory computer-readable storage media and executed on one or more processors associated with the components/devices.

Specifically, the system 100 includes a terminal 110, a transaction manager 120, a scanner 130 having an item scan manager 131, and a bagging area detection mechanism 140.

Existing retail-based terminal systems count the number of items that pass in front of a scanner or that is in front of the scanner; however, these systems fail to correlate any of the items with a detected barcode.

Various embodiments presented herein, detect when an item passes in front of a scanner/camera and correlates the item with a barcode read to determine if the bypass was intended as fraud (theft). Embodiments, presented herein, also provide mechanisms for determining when missed barcode reads are accounted for and therefore unintentional and not problematic.

The process proceeds as follows, in one embodiment:

(1) The item scan manager 131 of the scanner 130 waits for a presence of an item to be detected.

(2) The item scan manager 131 waits for the item to leave the field of view of the scanner 130.

(3) When there is no barcode detected for the item one or more of the following is performed:

(a) An alert is raised through the transaction manager 120 of the terminal 110 by the item scan manager 131 to request an attendant at the terminal 110 during the ongoing transaction.

(b) An event is correlated with a security video stream from a camera capturing video of the ongoing transaction, the event may be correlated based on time of day, transaction identifier, and terminal identifier.

(c) A tally or total for the transaction is incremented to indicate that an item was unaccounted for during the transaction.

(d) An alert is provided to the transaction manager 120 to record an event for the alert in the terminal log or to increment a counter (tally) on the terminal 110.

(4) If any tallies exceed a predefined configured threshold, then a cashier operating the terminal 100 on behalf of a customer during a transaction or a customer that is operation the terminal 100 (during a Self-Service Checkout (SSCO) is flagged for real-time investigation before the transaction concludes at the terminal 100. In an embodiment, the predefined configured threshold exceeds just 1 missed barcode read. In an embodiment where there is a cashier, the predefined configured threshold is set to be when the cashier exceeds one bypass (missed barcode read) every 15 minutes.

In an embodiment, (1) can be performed in a variety of manners. For example, the scanner 130 maintains an image as a reference image for what the field of view looks like (image) when there is no item present, such that when an item is placed within the field of view, the reference image is changed. The scanner 130 can include a motion detector to detect motion in proximity to the scanner to trigger an image being taken. Three dimensional cameras can be used. Infrared sensors can be integrated into the scanner 130. Other techniques can be used as well.

Conventional approaches perform the processing of (1) and (2) but not for purposes of item bypass detection; rather such processing is used for regulating the scanner's sleep mode and for turning off illumination of the light sources for the scanner. In fact, conventionally analytics are used for bypass detection, such systems are not processed within the scanner and they are not real time so as to detect the bypass scanning during a transaction to prevent such bypass scanning.

The processing correlates barcodes to item swipes to determine when bypass scanning is occurring at the terminal 110. This processing is performed within the scanner 130 and/or, in some cases, within the scanner 130 and the terminal 110. The processing is achieved in real time, so as to prevent shoplifting before it occurs (customer leaves the store).

In an embodiment, the above processing (referred to herein as "bypass item scan processing") is further enhanced for determining when a bypass item scan is unintentional or otherwise accounted for during the transaction. The processing referenced below is referred to herein as "enhanced bypass item scan processing."

With the enhanced bypass item scan processing the bagging area detection mechanism 140 is utilized as discussed herein and below.

A true bypass item scan means: (a) the operator (cashier or customer) pretends to scan an item but does not scan the item, and (b) the missed item is placed in the bagging area of the terminal 110.

From the point of view of the scanner 130, a true bypass item scan appears similar to an unintentional failed scan because: (a) the operator tries to scan the item barcode but due to barcode positioning or poor print quality of the item barcode, the item barcode failed to scan and appears to the scanner to be a bypass item scan; (b) the operator repeats (a) until the barcode is properly read by the scanner 130; and (c) the operator places the item in the bagging area of the terminal 110.

There are other motions at the terminal 110 during a checkout that can also be misinterpreted by the scanner 130 as a bypass item scan, such as: (a) the operator ties to scan the item but cannot scan the item because of a poor quality barcode, (b) the operator hand keys in the barcode into the terminal 110 (through a terminal keypad or touchscreen peripheral), and (c) the operator puts the item into the bagging area. In still another situation: (a) the operator tries to scan the item but cannot due to a poor quality barcode, (b) the operator uses a handheld scanner also available at the terminal 110 to scan the item (handheld scanners can sometimes read barcodes that bioptic scanners cannot), and (c) the operator places the item into the bagging are of the terminal 110. In yet another situation, the operator may have multiple items that are the same type and brand of item, such that the operator: (a) sees that the operator has multiple items that are the same item, (b) the operator scan just one of the items and then keys in an item quantity, (c) the operator puts all of the items into the bagging area (note with this situation some of the multiple items may actually pass within the field of view of scan zone of the scanner 130 and appear to be one or more bypass item scans during a transaction). There is still yet another situation in which an action during a checkout at the terminal can be misinterpreted as a bypass item scan this is when a produce item is entered: (a) the operator places the produce item on the scanner weight plate (note that this is a case where the scanner 130 is a dual scanner and weigh scale integrated as a single device), (b) the operator keys in the produce item's PLU (note that (b) may come before (a) in some terminal 110 configurations), (c) the terminal 110 measures the sale weight for the produce item, and (d) the operator moves the produce item to the bagging area of the terminal 110.

In the enhanced bypass item scan processing data fusion is processed to reduce false alarms and improve the accuracy of the bypass item scan processing presented above by utilizing a bagging area detection mechanism 140.

The bagging area detection mechanism 140 can include one or more of the following type devices that are interfaced to the terminal 110: a security scale in the bagging area, an optical beam sensor at a takeaway conveyance belt of the terminal 110, a motion detector, an intelligent camera that monitors the bagging area of the terminal 110, a vibration sensor attached to the bagging area of the terminal 110, a sensor that detects security tags on the items in the bagging area of the terminal 110 (the sensors can be connected to the terminal 110 and/or the scanner 130).

The enhanced bypass item scan processing utilizes data points provided by the bagging area detection mechanism 140 during checkout at the terminal 110 by adding processing to (3) of the bypass item scan processing (discussed above) to include:

(e) Determination of a bagging area fail safe event for the detected bypass item scan, which includes not detecting the item in the bagging area or detecting that the item was placed in the bagging area and then removed from the bagging area utilizing data provided by the bagging area detection mechanism 140.

(f) (optional) Determination of a terminal fail safe event to detect whether: an item that was detected as a bypass item scan was scanned by an integrated handheld scanner of the terminal 110, a single item barcode was keyed in for the item through the touchscreen or keypad of the terminal 110, multiple items were keyed in when the there are multiple same items during the transaction and keyed in with a quantity of greater than 1, and a produce item was keyed in The enhanced processing of (e) and (f) are added before (3) of the bypass item scan processing raises an alert for assistance in real time at the terminal 110 during a transaction. This increases the accuracy of bypass item scan detection and reduces false positives for a transaction.

"Bagging area fail-safe event" is intended to mean that the system 100 has not detected an item in the bagging area, presumably because the customer still has the item in the customer's hand. There are two processing paths for detecting this fail-safe event. The first path "no item detected in the bagging area" means the bagging area detection mechanism 140 does not detect the item in the bagging area before a next bypass scan event is detected by the scanner 130. The second path "item detected in the bagging area but then removed" means the bagging area detection mechanism 140 detected an item in the bagging area, and then detected the operator removed the item before the next bypass item scan or scan event.

"Terminal fail-safe event" is intended to mean that the transaction manager 120 and/or item scan manager 131 has detected and determined an unusual event. Such events include: item scanned via a handheld scanner, a single barcode was keyed in for multiple items that are the same item, a produce item was entered (keyed in). Note in some configurations the item scan manager 131 detects handheld scan when the handheld scanner is directly interfaced to the scanner 130.

It is noted that the enhanced bypass item scan processing is particularly valuable in the industry because: assisted-service terminals (POS terminals) do not have bagging security scale intervention processing, many retailers are disabling SST bagging security scale interventions because customers are becoming annoyed with the many security exceptions being raised during SSCOs, many SST attendants routinely override bagging security scale alerts because of the large number of false positives generated by the existing bagging security scale systems, and many SSTs lack any bagging security scale system in the industry.

Again, the enhanced bypass item scan processing improves the bypass item scan processing by accounting for a number of potential situations during checkout that are not situations in which an item is being bypassed for non-payment at the terminal 110 (reduces false positives of the bypass item scan processing as discussed above).

In an embodiment, the terminal 110 is a POS terminal operated by a cashier that assists in checking out a customer at a retailer during a transaction in which items are being purchased from the retailer.

In an embodiment, the terminal 110 is a SST operated by a customer that is performing a SSCO with a retailer during a transaction in which items are being purchased from the retailer.

In an embodiment, the bypass item scan processing and the enhanced bypass item scan processing are performed by the item scan manager 131 on the scanner 130.

In an embodiment, the bypass item scan processing and the enhanced bypass item scan processing are performed by a combination of the item scan manager 131 on the scanner 130 and the transaction manager 120 on the terminal 110.

The above discussed embodiments and other embodiments are now discussed with reference to the FIGS. 2-4.

Figure 2:
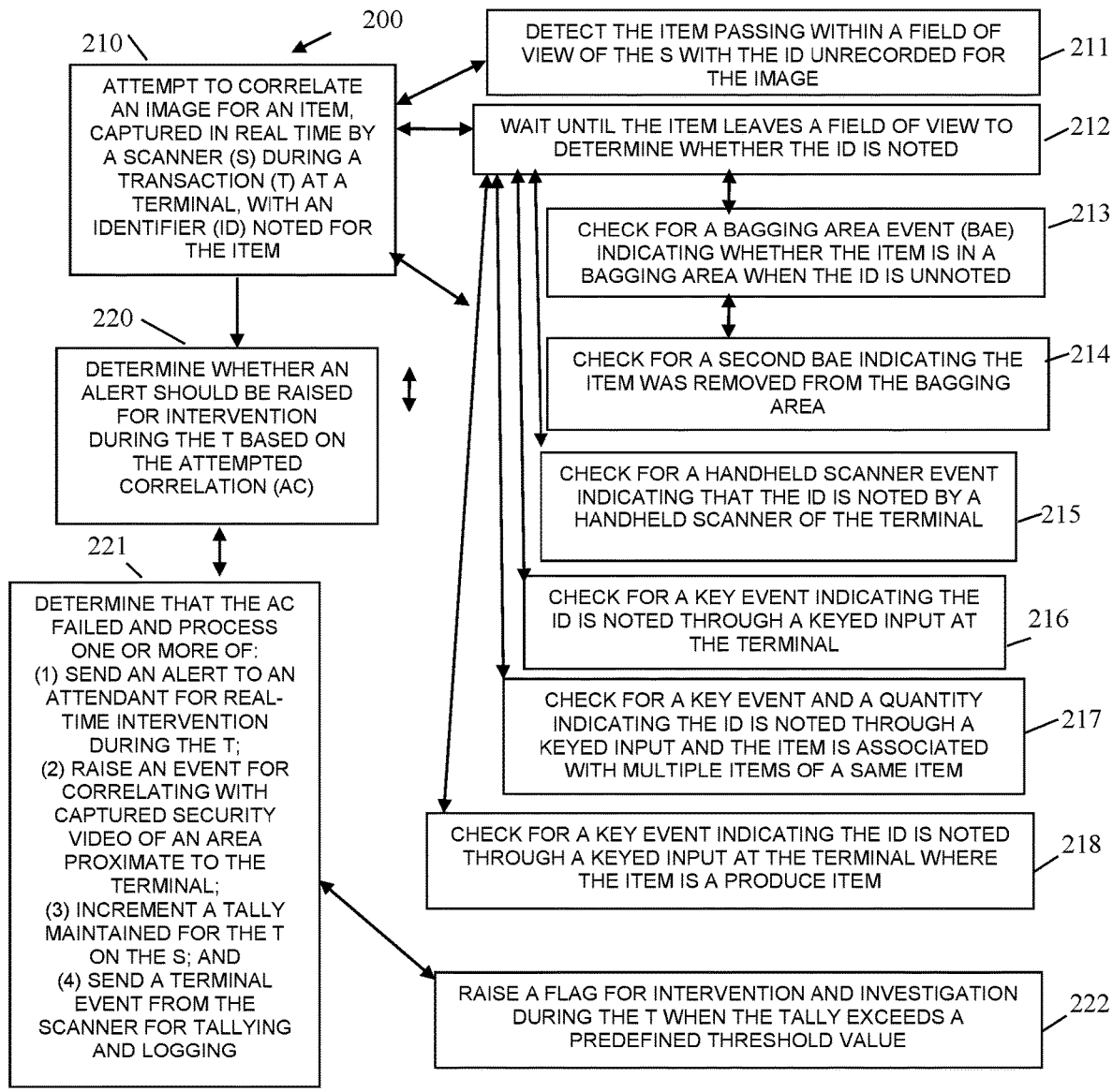
FIG. 2 is a diagram of a method for real-time bypass detection in a scanner, according to an example embodiment.

FIG. 2 is a diagram of a method 200 for real-time bypass detection in a scanner, according to an example embodiment. The software module(s) that implements the method 200 is referred to as a "bypass item scan detector." The bypass item scan detector is implemented as executable instructions programmed and residing within memory and/or a non-transitory computer-readable (processor-readable) storage medium and executed by one or more processors of a device. The processor(s) of the device that executes the bypass item scan detector are specifically configured and programmed to process the bypass item scan detector. The bypass item scan detector may have access to a network during its processing. The network can be wired, wireless, or a combination of wired and wireless.

In an embodiment, the device that executes the bypass item scan detector is the scanner 130.

In an embodiment, the devices that executes the bypass item scan detector is a combination of the terminal 110 and the scanner 130.

In an embodiment, the bypass item scan detector is the item scan manager 131.

In an embodiment, the bypass item scan detector is a combination of the transaction manager 120 and the item scan manager 131.

At 210, the bypass item scan detector attempts to correlate an image for an item, captured in real time by the scanner during a transaction at a terminal, within an identifier noted for the item. That is, the bypass item scan detector determines whether an image for an item processed during a transaction can be correlated to an item identifier noted in the transaction.

According to an embodiment, at 211, the bypass item scan detector detects the item passing within a field of vice of the scanner with the item identifier being unrecorded for the image of the item.

In an embodiment, at 212, the bypass item scan detector waits until the item leaves a field of view to determine whether the item identifier is noted or unnoted for the transaction.

In an embodiment of 212 and at 213, the bypass item scan detector checks for a bagging area event indicating whether the item is in a bagging area when the item identifier is detected as being unnoted. This was discussed above with the enhanced item bypass scan processing presented with the FIG. 1. The device or sensor providing the bagging area event can be any of the bagging area detection mechanisms 140 discussed with the FIG. 1.

In an embodiment of 213 and at 214, the bypass item scan detector checks for a second bagging area event indicating the item was removed from the bagging area.

In an embodiment of 212 and at 215, the bypass item scan detector checks for a handheld scanner event indicating that the item identifier is noted by a handheld scanner of the terminal.

In an embodiment of 212 and at 216, the bypass item scan detector checks for a key event indicating the item identifier is noted through a keyed input at the terminal.

In an embodiment of 212 and at 217, the bypass item scan detector checks for a key event and a quantity indicating that the item identifier is noted through a keyed input and the item is associated with multiple items being processed for the transaction of a same item type.

In an embodiment of 212 and at 218, the bypass item scan detector checks for a key even indicating the item identifier is noted through a keyed input at the terminal where the item is a produce items.

The processing discussed at 212-218 alters the any correlation to account for false positives that would otherwise indicate that the item was not being paid for during the transaction at the terminal as was discussed above with the enhanced item scan bypass processing with the FIG. 1.

At 220, the bypass item scan detector determines whether an alert should be raised for real-time intervention during the transaction based on the attempted correlation.

In an embodiment, at 221, the bypass item scan detector determines that the attempted correlation failed and processes one of: (1) sending an alert to an attendant for real-time intervention during the transaction; (2) raises an event for correlating with a captured security video of an area proximate to the terminal; (3) increments a tally maintained for the transaction on the scanner; and (4) sends a terminal event from the scanner to the terminal for tallying and logging on the terminal.

Figure 3:
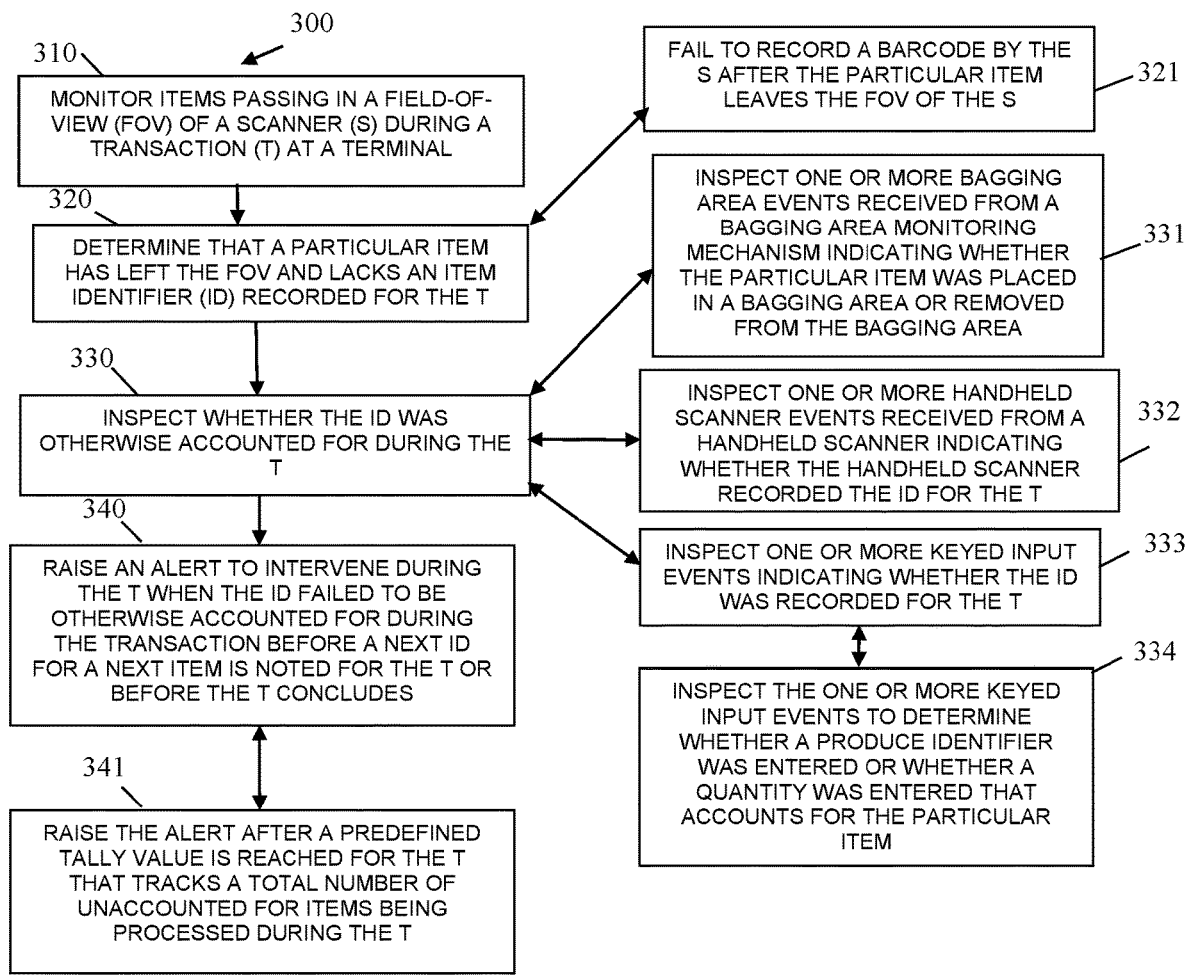
FIG. 3 is a diagram of another method for real-time bypass detection in a scanner, according to an example embodiment.

FIG. 3 is a diagram of another method 300 for real-time bypass detection in a scanner, according to an example embodiment. The software module(s) that implements the method 300 is referred to as a "real-time item bypass scan detector." The real-time item bypass scan detector is implemented as executable instructions programmed and residing within memory and/or a non-transitory computer-readable (processor-readable) storage medium and executed by one or more processors of a hardware device. The hardware processors that execute the real-time item bypass scan detector are specifically configured and programmed to process real-time item bypass scan detector. The real-time item bypass scan detector may have access to one or more networks during its processing. Each network can be wired, wireless, or a combination of wired and wireless.

The real-time item bypass scan detector presents another and in some ways enhanced processing perspective of the FIG. 2.

In an embodiment, the device that executes the real-time item bypass scan detector is the scanner 130.

In an embodiment, the devices that execute the real-time item bypass scan detector is a combination of the terminal 110 and the scanner 130.

In an embodiment, the real-time item bypass scan detector is the item scan manager 131.

In an embodiment, the real-time item bypass scan detector is a combination of the transaction manager 120 and the item scan manager 131.

In an embodiment, the real-time item bypass scan detector is the method 200 of the FIG. 2.

At 310, the real-time item bypass scan detector monitors items passing in a field of view of a scanner during a transaction at a terminal (SST or POS terminal).

At 320, the real-time item bypass scan detector determines that a particular item has left the field of view and lacks an item identifier recorded for the transaction.

According to an embodiment, at 321, the real-time item bypass scan detector determines that the scanner failed to record a barcode after the particular item leaves the field of view of the scanner.

At 330, the real-time item bypass scan detector inspects whether the item identifier was otherwise accounted for during the transaction.

In an embodiment, at 331, the real-time item bypass scan detector inspects one or more bagging area events received from a bagging area monitoring mechanism indicating whether the particular item was placed in a bagging area or removed from the bagging area.

In an embodiment, at 332, the real-time item bypass scan detector inspects one or more handheld scanner events received from a handheld scanner indicating whether the handheld scanner recorded the item identifier for the transaction.

In an embodiment, at 333, the real-time item bypass scan detector inspects one or more keyed input events indicating whether the item identifier was recorded for the transaction.

In an embodiment of 333 and at 334, the real-time item bypass scan detector inspects the one or more keyed input events to determine whether a produce identifier was entered or whether a quantity was entered that accounts for the particular item.

At 340, the real-time item bypass scan detector raises an alert to intervene during the transaction (in real time) when the item identifier failed to be otherwise accounted for during the transaction before a next item identifier for a next item is noted for the transaction or before the transaction concludes.

In an embodiment, at 341, the real-time item bypass scan detector raises the alert after a predefined tally value is reached for the transaction that tracks a total number of unaccounted for items being processed during the transaction. In an embodiment, the predefined tally value is 1. In an embodiment, the predefined tally value is greater than 1.

Figure 4:
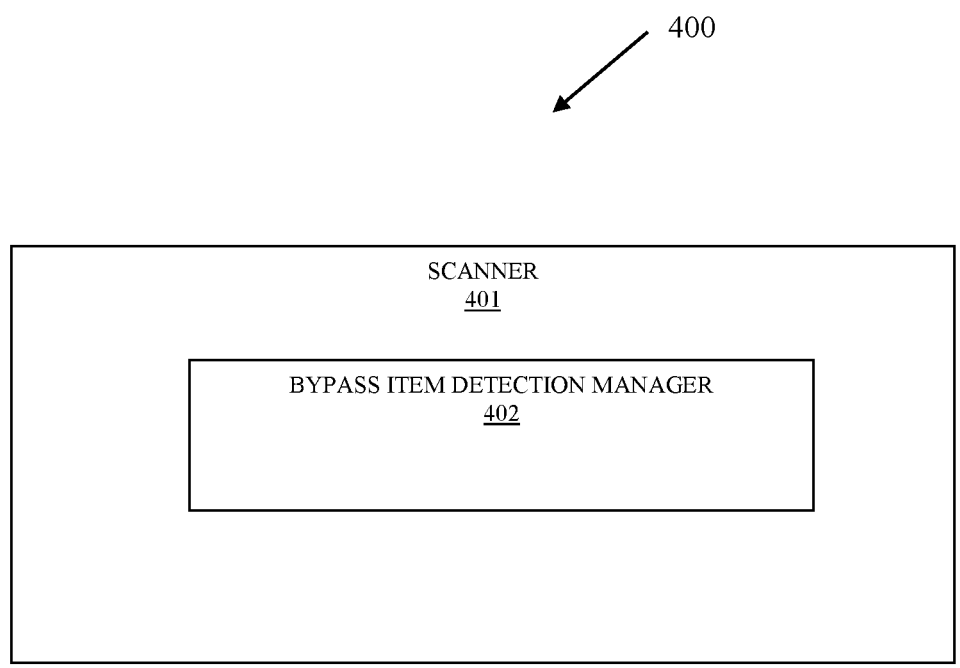
FIG. 4 is a diagram of terminal, according to an example embodiment.

FIG. 4 is a diagram of terminal 400, according to an example embodiment. Some components of the terminal 400 are programmed and reside within memory and/or a non-transitory computer-readable medium and execute on one or more processors of the terminal 400 and/or integrated peripheral devices of the terminal 400. The terminal 400 communicates over one or more networks, which can be wired, wireless, or a combination of wired and wireless.

In an embodiment, the terminal 400 is terminal 110.

In an embodiment, the terminal 400 implements, among other things, the processing discussed in the FIGS. 1-3.

The terminal 400 includes an integrated peripheral scanner 401 and a bypass item detection manager 402.

The bypass item detection manager 402 is configured to: 1) execute on at least one processor of the scanner 401, 2).

In an embodiment, the terminal 400 is a POS terminal operated by a cashier to checkout customers during transactions with a retailer.

In an embodiment, the terminal is a SST operated by a customer performing a SSCO with a retailer.

In an embodiment, the bypass item detection manager 402 is further configured to: i) execute on at least one processor of the scanner 401, ii) detect when an item passes in front of a field of view of the scanner 401 without having an item identifier recorded for a transaction at the terminal, iii) ensure that the item identifier was not otherwise accounted for in the transaction, and iv) raise an alert in real time during the transaction when the item identifier was not otherwise accounted for during the transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

attempting, by a scanner, to correlate an image for an item, wherein the image is captured in real time by the scanner during a transaction at a terminal, with an identifier associated with the item, and wherein the scanner captures item codes as item identifiers on transaction items and also captures item images during the transaction, wherein attempting further includes determining that a reference image has changed for the scanner because of a presence of the item detected in the reference image, wherein the reference image before being changed by the presence of the item comprised a field-of-view for the scanner when there were not any items present, and wherein the reference image for a current field-of-view of the scanner when changed comprises the item, and wherein attempting further includes inspecting one or more handheld scanner events received from a handheld scanner indicating whether the handheld scanner recorded the identifier for the transaction;

determining, by the scanner, whether an alert should be issued for intervention during the transaction when the identifier is not identified from the image in the attempting; and correlating an event raised by the scanner when the alert is issued with a security video stream captured from a camera that captures the security video stream during the transaction, wherein correlating further include correlating the event with the security video stream based on time of day, a transaction identifier for the transaction, and a terminal identifier for the terminal.

2. The method of claim 1, wherein attempting further includes detecting the item passing within the current field-of-view of the scanner with the identifier not captured with the image.

3. The method of claim 1, wherein attempting further includes waiting until the item leaves the field-of-view of the scanner to determine whether the identifier is recorded.

4. The method of claim 3, wherein attempting further includes checking for a bagging area event indicating whether the item is in a bagging area when the identifier for the item is not recorded.

5. The method of claim 4, wherein checking further includes checking for a second bagging area event indicating whether the item was removed from the bagging area.

6. The method of claim 3, wherein attempting further includes checking for a key event indicating the identifier is recorded through a keyed input at the terminal.

7. The method of claim 3, wherein attempting further includes checking for a key event indicating the identifier is recorded through keyed input and the item is associated with multiple items of a same item.

8. The method of claim 3, wherein attempting further includes check for a key event indicating the identifier is recorded through a keyed input at the terminal where the item is a produce item.

9. The method of claim 1, wherein determining further includes determining that the attempted correlation failed and processing one or more of:

sending an alert to an attendant for real-time intervention during the transaction;

incrementing a tally maintained for the transaction on the scanner; and sending a terminal event to the terminal from the scanner for tallying and logging.

10. The method of claim 9, wherein determining the attempted correlation failed further includes issuing a flag for intervention and investigation during the transaction when the tally exceeds a predefined threshold value.

11. A method, comprising:

monitoring, by a scanner, items passing in a current field-of-view of the scanner during a transaction at a terminal, wherein monitoring further includes determining that a reference image changes because of presences of the items detected in the reference image, wherein the reference image before being changed by the presences of the items comprised a field-of-view for the scanner when there are not any of the items present, and wherein the reference image for the current field-of-view of the scanner when changed comprises the items;

determining, by the scanner, that a particular item has left the current field-of-view and lacks an item identifier recorded for the transaction, and wherein the scanner captures item codes as item identifiers on transaction items and also captures item images during the transaction;

inspecting, by the scanner, whether the item identifier was otherwise accounted for during the transaction, wherein inspecting further includes inspecting one or more handheld scanner events received from a handheld scanner indicating whether the handheld scanner recorded the item identifier for the transaction;

issuing, by the scanner, an alert to intervene during the transaction: when a next item identifier for a next item in the transaction is identified and the item identifier failed to be detected before the next item identifier is recorded for the transaction or when the transaction concludes without the item identifier being detected; and correlating an event raised by the scanner when the alert is issued with a security video stream captured from a camera that captures the security video stream during the transaction, wherein correlating further include correlating the event with the security video stream based on time of day, a transaction identifier for the transaction, and a terminal identifier for the terminal.

12. The method of claim 11, wherein determining further includes failing to record a barcode by the scanner after the particular item leaves the current field-of-view of the scanner.

13. The method of claim 11, wherein inspecting further includes inspecting one or more bagging area events received from a bagging area monitoring mechanism indicating whether the particular item was placed in a bagging area or removed from the bagging area.

14. The method of claim 11, wherein inspecting further includes inspecting one or more keyed input events indicating whether the item identifier was recorded for the transaction.

15. The method of claim 14, wherein inspecting further includes inspecting the one or more keyed input events to determine whether a produce identifier was entered for the particular item or whether a quantity was entered that accounts for the particular item.

16. The method of claim 11, wherein issuing further includes issuing the alert after a predefined tally value is reached for the transaction that tracks a total number of unaccounted for items being processed during the transaction.

17. A terminal, comprising:

a scanner comprising a processor and a non-transitory computer-readable storage medium comprising executable instructions for a bypass item detecting manager;

the bypass item detecting manager executed by the processor from the non-transitory computer-readable storage medium causing the processor to perform processing comprising:

detecting when an item passes in front of a current field-of-view of the scanner without having an item identifier recorded for a transaction at the terminal, wherein detecting further includes detecting the item by determining that a reference image has changed for the scanner because of a presence of the item detected in the reference image, wherein the reference image before being changed by the presence of the item comprised a field-of-view for the scanner when there are not any items present, and wherein the reference image for the current field-of-view of the scanner when changed comprises the item;

ensuring that the item identifier was not otherwise accounted for in the transaction by inspecting one or more handheld scanner events received from a handheld scanner indicating whether the handheld scanner recorded the item identifier for the transaction;

issuing an alert in real time during the transaction when the item identifier was not otherwise accounted for during the transaction; and correlating an event raised by the scanner when the alert is issued with a security video stream captured from a camera that captures the security video stream during the transaction, wherein correlating further include correlating the event with the security video stream based on time of day, a transaction identifier for the transaction, and a terminal identifier for the terminal, and wherein the scanner captures item codes as item identifiers on transaction items and also captures item images during the transaction.

18. The system of claim 17, wherein the terminal is one of: Self-Service Terminal (SST) and a cashier-assisted Point-Of-Sale (POS) terminal.

\* \* \* \* \*